Patented Nov. 2, 1943

2,333,396

UNITED STATES PATENT OFFICE 2,333,396

UREA-FORMALDEHYDE RESIN MOLDING

Charles R. Stock, Greenwich, Conn., assignor to American Cyanamid Company, New York, N. Y., a corporation of Maine No Drawing. Application August 14, 1941, Serial No. 406,809

4 Claims. (Cl. 260—9).

This invention relates to translucent moldings of urea-formaldehyde condensation products and cellulose pulp.

It is known that heat and pressure moldings of urea-formaldehyde resins and cellulose pulp yellow on exposure to light, especially sunlight. It is an object of this invention, therefore, to provide heat and pressure molded translucent articles of urea-formaldehyde resin and cellulose pulp with a high degree of resistance to yellowing on exposure to light.

According to my invention this and other objects may be accomplished by incorporating in the resinous molding composition of urea-formaldehyde condensation product and cellulose pulp from about 0.1% to about 0.55% and preferably about 0.26% of titanium dioxide based on the weight of the cellulose.

The invention is illustrated by the following tests in which hot pressed moldings of a molding composition of urea-formaldehyde resin and cellulose pulp containing varying amounts of titanium dioxide were observed for color change after exposure to sunlight.

In these tests a molding powder was prepared by mixing the resin syrup obtained by the condensation of urea and formaldehyde in the molecular proportion of 1:1.3 with an amount of alpha-cellulose pulp such that upon drying the resinous mixture at an elevated temperature, e. g. about 190° F. there was obtained a grindable mixture of resin and pulp containing 37% by weight of alpha-cellulose pulp and the balance resin. To 1000 gram samples of this resin-pulp mixture were added respectively 0.2, 0.5, 1.0, 2.0 and 5.0 grams of titanium dioxide. The samples containing the titanium dioxide as well as a similar sample not containing titanium dioxide were then separately ground for 12 hours along with a curing catalyst and a mold lubricant to obtain molding compositions in powder form.

The titanium dioxide was thoroughly dispersed in the molding powders by the grinding operation.

The several samples were molded under the same applied heat and pressure and color reflectance curves were taken on each of the moldings by means of a spectrophotometer. Thereafter the moldings were exposed to 75 hours of sunlight, following which color reflectance curves were again taken thereon. The curves in each instance were analyzed to determine the changes which had taken place during exposure. These changes are tabulated below.

| Sample | $TiO_2$ wt. in grams | $TiO_2$ % wt. on cellulose | Original color | | | Color after test | | | Whiteness difference 75 hr./orig. |
|---|---|---|---|---|---|---|---|---|---|
| | | | % Ref.[1] | Dom. w. l.[2] | % E. P.[3] | % Ref.[1] | Dom. w. l.[2] | % E. P.[3] | |
| 1 | 0.0 | 0.00 | 58.7 | 530 | 0.9 | 57.8 | 563 | 4.8 | ca. 45.0 |
| 2 | 0.2 | 0.054 | 62.9 | 563 | 2.9 | 61.2 | 563 | 3.7 | 24.0 |
| 3 | 0.5 | 0.135 | 65.7 | 512 | 0.7 | 63.2 | 541 | 1.4 | 5.0 |
| 4 | 1.0 | 0.27 | 69.6 | 531 | 0.9 | 66.4 | 518 | 0.8 | 1.3 |
| 5 | 2.0 | 0.54 | 75.0 | 555 | 1.6 | 69.7 | 500 | 1.1 | 5.0 |
| 6 | 5.0 | 1.35 | 81.7 | 568 | 3.0 | 72.5 | 487 | 2.0 | 18.5 |

[1] % Ref.=per cent visual reflectance.
[2] Dom. w. l.=dominant wavelength (hue), in millimicrons.
[3] % E. P.=per cent excitation purity (saturation) of the color.

The last column in the above table indicates the relative magnitudes of change-of-appearance undergone by the sample moldings during sunlight exposure. These magnitudes are denoted as whiteness difference units and were calculated in accordance with the method of D. B. Judd, Paper Trade Journal, vol. 103, No. 8, page 38 (1938), Journal Optical Soc. of America, vol. 28, page 52 (1938).

It is apparent from the results in the above table that the color of moldings of urea-formaldehyde resin and cellulose pulp is improved in respect to light induced yellowing by the presence of a small amount of titanium dioxide, and that freedom from this yellow discoloration increases with increasing concentration of titanium dioxide. It is further apparent from these results that excessive amounts of titanium dioxide will result in imparting a bluish hue to the moldings which may also be undesirable.

A curve constructed from the whiteness difference units as ordinates and the per cent concentrations of titanium dioxide as abscissae illustrates the effect of increasing and decreasing concentrations of titanium dioxide on light induced yellowing of moldings of urea-formaldehyde resins and cellulose pulp. The curve extends into the yellow and blue color fields. In the yellow color field the curve is approximately a straight line for the major portion of its extent and with negative sign slopes abruptly downward until rounding off, it passes through a point which marks the transition in color from yellow to blue. The curve while yet rounded, but to a lesser extent, slopes with positive sign upwardly into the blue color field at a rate more moderate than that in the yellow color field. For the larger portion of its extent in the blue color field the curve is a straight line.

The transition point between the color fields indicates the optimum quantity of titanium dioxide, about 0.26% based on the weight of the cellulose in the molding composition, for obtaining the maximum freedom from light induced yellowing of translucent moldings of urea-formaldehyde resin and cellulose pulp.

While I have determined the optimum quantity of titanium dioxide for maximum freedom from yellow discoloration of translucent molded articles of urea-formaldehyde resin and cellulose pulp, it is apparent from my investigation that the benefits to be derived therefrom are not limited to the use of the optimum quantity of titanium dioxide. Good results may be obtained with quantities of titanium dioxide within the range of about 0.1% to 0.55% based on the weight of the cellulose to be contained in the molded article. Moldings possessing a relatively high degree of freedom from light-induced yellow discoloration may be obtained with quantities of titanium dioxide within the above mentioned range. The color quality of such moldings will be exceeded only by the excellent color of moldings hot pressed from molding compositions containing the optimum quantity of titanium dioxide.

While I have described my invention with reference to the production of translucent moldings of natural or white color, the advantages thereof are not confined thereto but the invention may be applied with good results to the production of colored translucent moldings, i. e., those which are dyed or but lightly pigmented (pastel shades).

Wherever I have referred to a urea-formaldehyde resin or condensation product, I intend this term to include mixtures of such resins prepared from varying ratios of urea and formaldehyde.

Since changes and modifications may be made in the invention without departing from the spirit and scope thereof, the foregoing description is not intended by way of limitation of the invention except as may be defined in the appended claims.

I claim:

1. A molding composition suitable for the production of non-yellowing molded articles which comprises a urea-formaldehyde resin, cellulose pulp and from about 0.1% to about 0.55% of titanium dioxide based on the weight of the cellulose pulp.

2. A molding composition suitable for the production of non-yellowing molded articles which comprises a urea-formaldehyde resin, cellulose pulp and about 0.26% of titanium dioxide based on the weight of the cellulose pulp.

3. A resinous translucent molded article having a high degree of freedom from yellowing on exposure to light, obtained by subjecting to a heat and pressure molding operation a molding composition comprising a urea-formaldehyde resin, cellulose pulp and from about 0.1% to about 0.55% of titanium dioxide based on the weight of the cellulose pulp.

4. A resinous non-yellowing translucent molded article obtained by subjecting to a heat and pressure molding operation a molding composition comprising a urea-formaldehyde resin, cellulose pulp and about 0.26% of titanium dioxide based on the weight of the cellulose pulp.

CHARLES R. STOCK.